UNITED STATES PATENT OFFICE.

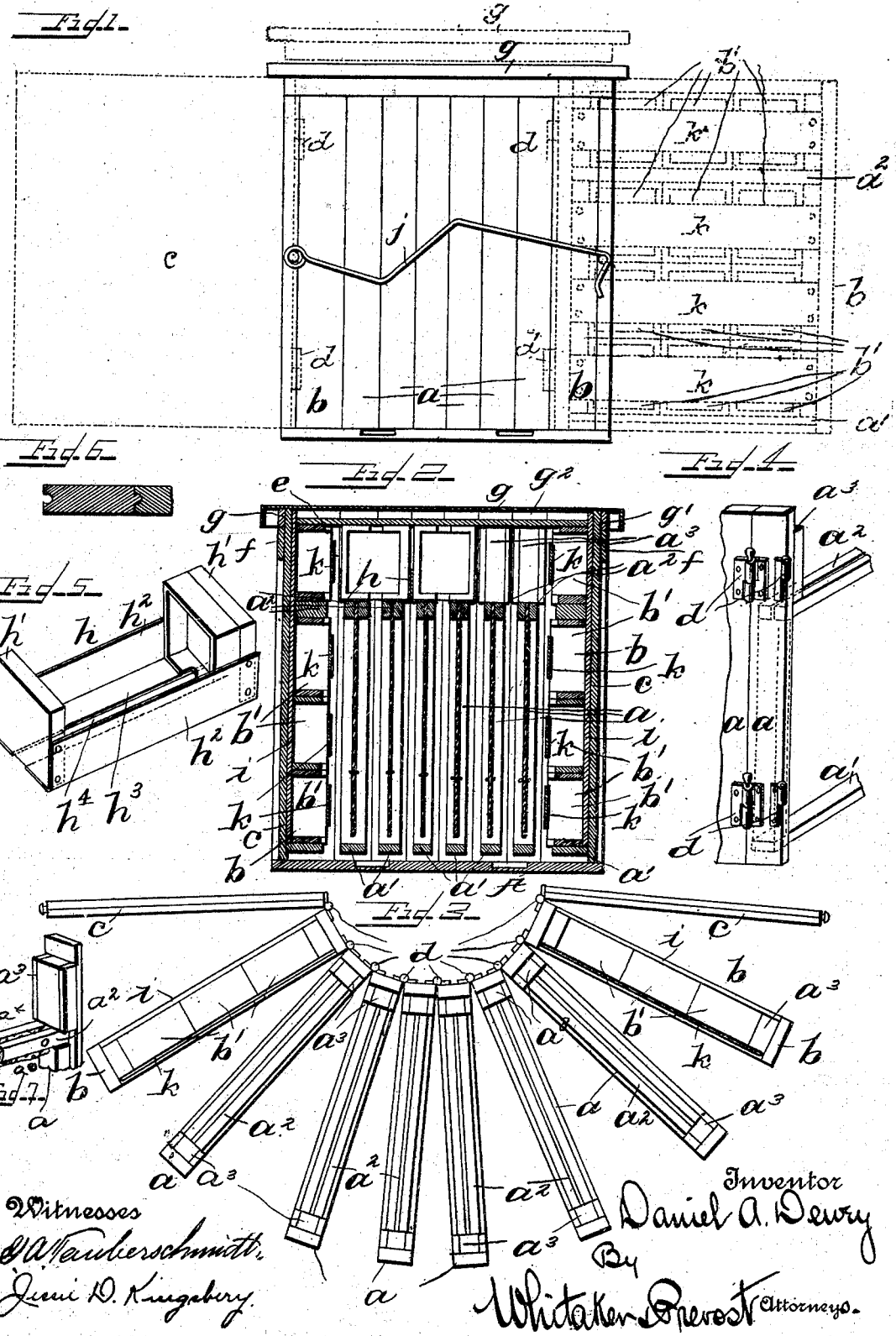

DANIEL A. DEWEY, OF COLUMBUS, PENNSYLVANIA.

BEEHIVE.

SPECIFICATION forming part of Letters Patent No. 502,486, dated August 1, 1893.

Application filed March 28, 1893. Serial No. 467,923. (No model.)

*To all whom it may concern:*

Be it known that I, DANIEL A. DEWEY, a citizen of the United States, residing at Columbus, in the county of Warren and State of Pennsylvania, have invented certain new and useful Improvements in Beehives; and I do hereby declare the following to be a full, clear, and exact description of the invention, such as will enable others skilled in the art to which it appertains to make and use the same.

My invention relates to the class of beehives, and is an improvement in the class of bee-hives known as frame hives, whereby the frames and the interior of the hives are made more readily accessible and more easily and completely under the control of the keeper.

My said invention is illustrated in the accompanying drawings and the same is disclosed in the following description and claims.

In the drawings Figure 1 is a front view of my improved hive showing in dotted lines at the left one of the hinged doors and at the right one of the hinged surplus frames opened. Fig. 2 is a sectional view of the hive on a line parallel with the front of the same. Fig. 3 is a top view of the hive with the top and cover board or plate removed and the frames separated at the front of the hive. Fig. 4 is a view of the preferred form of hinge for uniting the frames at the back or rear of the hive. Fig. 5 is a perspective view of the holder for surplus honey frames when placed over the main body of the hive. Fig. 6 shows a preferred form of joining the uprights of the main frames. Fig. 7 is a detail view of the top bar and the upper part of one of the uprights.

The central portion of my hive is composed of frames $a$ $a$ for holding combs for the brood and honey for the maintenance of the colony. At each side of these central or main hive frames, I place a frame $b$ for holding smaller frames $b'$ for the storage of surplus honey. On the outside of these storage frames I place boards or doors $c$ for closing the sides of the hive. The main hive frames $a$, the surplus frames $b$ and the doors $c$ are all united at the back of the hive by hinges $d$ as shown in Fig. 3. The uprights of the frames are made of such a breadth that when brought closely together they form a continuous side wall for the hive. I prefer to provide the meeting edges of such uprights with a bead and groove construction, as shown in Fig. 6 but this is not essential.

Any form of hinge may be employed to join the parts but such hinge should have the pintle removable, so that any particular frames can be removed and another substituted for it or the hive be divided for artificial swarming or other purposes.

The bottom bar $a'$ of the frames is located a little way from the bottom of the upright portions so that when the frames are brought together and placed upon a bottom board as shown at A in Fig. 1, there will be a space for the bees to pass freely to any part of the hive beneath these bars. The upper or top bar $a^2$ of the frames is located such a distance below the top of the uprights that a space is formed above these top bars for the reception of surplus honey frames, and the top of each upright is also rabbeted or otherwise provided with a shoulder as at $a^3$, (see Fig. 7,) so that when the parts are assembled this shoulder provides a ledge for the support of a covering board $e$. The doors extend upwardly to close the sides of the space above the main body of the hive and the storage frames are preferably made of the same size. The doors $c$ are each provided with a narrow ridge or cleat $f$ a short distance below their upper edges and the top or cap $g$ has a downwardly extending flange $g'$. When the top is placed in position this flange passes over the upper ends of the frame uprights and doors, and rests on the ridges $g'$ holding the top in such a position as to form the dead air space $g^2$ above the covering board $e$.

In placing the surplus frames in the space above the body of the hive I prefer to employ a box $h$ like that shown in Fig. 5 for holding the same. This box consists in this instance of the end pieces $h'$ $h'$ of approximately the size of the surplus honey frames and side strips $h^2$ and a bottom $h^3$. This bottom is provided with means for the ingress and egress of the bees, preferably by one or more longitudinal slots $h^4$. It may be made in other ways if desired. This bottom may be formed by making the same of two or more strips of material. This form of surplus frame holder enables me to place such frames upon and have them supported by the main hive frames with the loss of but little or no space between them. I prefer to place a plate of glass in the outer side of the hinged storage frames *b* as shown at *i* so that at any time on opening one or both of the doors *c* the part of the hive adjacent thereto can be inspected without opening the hive and disturbing the bees.

To one of the doors *c* is secured a hasp *j* and the opposite door is provided with a headed pin, nail or staple to be engaged by the hook of the hasp. This hasp I make of the form shown and of such a length as to engage the retaining pin or staple with some force so that it will tend to draw the parts together, and hold them against one another. The form of the hasp is given it to secure the necessary elasticity but any other form of hasp that will secure the result may be employed.

In Figs. 1 and 2 I have shown the hinged storage frames *b* of the hive as being provided with strips *k* of thin wood or metal to retain the surplus frames in position. This is not essential but is a matter of convenience in handling as with this provision the frames can be handled more quickly and with less care.

In practice it is desirable to provide the frames *a* with a comb foundation to insure the building of the comb in proper alignment within the frames and in order that this may be readily inserted in the frames the top bars of the frames are made in two parts, and I prefer to secure one part only rigidly to the frames and then after placing the comb foundation in place between them, secure the other part of the bar to it by screws, short nails or otherwise thus securing the foundation firmly in place. This construction is shown most clearly in Fig. 7. The top bar of the frame $a^2$ is in this instance made of two parts $a^x$ and $a^\circ$. The former $a^x$ is rigidly secured to the uprights to form the frame, while $a^\circ$ is secured to the part $a^x$ by nails or screws clamping the comb foundations between them as shown.

While I have shown and described my hive as provided with the side storage frames, it is obvious that it can be made without them, a sufficient number of frames *a* being employed to give the hive the size desired.

It will be seen that by my construction I provide a hive in which the keeper has easy and ready access to the interior of the same for any purpose. Any of the frames of the same can at any time be removed. Space for storage frames is also provided at the top and a dead air space above the same to protect the bees from the extremes of heat and cold.

If it is desired to place the hives in winter quarters, where they shall be given additional protection from cold weather, this can be easily and cheaply effected by removing the storage frames from the hives, when they can be placed in close juxtaposition and occupy a minimum of space. By removing the top or cap and the hasp *j* at any time, the frames forming the hive can be swung apart and the interior examined, the hive cleaned, drone brood removed or such other changes as may be desired effected, and the hive restored to its normal condition with but little loss of time or disturbance of the bees.

The storage frames *b* may be utilized for feeding weak swarms after the honey storing season is past. The small frames being removed they may be replaced by suitable feeding devices, which on closing the hive are wholly within the same, and of easy access to the colony without tempting stronger swarms to rob them.

What I claim, and desire to secure by Letters Patent, is—

1. A bee-hive composed of a series of frames and doors closing the sides of the frames, the said frames and doors being hinged together at one side of the hive, and detachably secured together at the opposite side, substantially as described.

2. A bee-hive composed of a series of frames, doors closing the sides of the frames, the said frames and doors being hinged together at one side of the hive and an elastic securing device at the opposite side, substantially as described.

3. A bee-hive composed of a series of frames, doors closing the ends of the frames, and a top, the said frames and doors inclosing a space for surplus frames above the main body of the hive, substantially as described.

4. A bee-hive composed of a series of frames, and doors closing the ends of the frames, said frames and doors being separately hinged together at one side of the hive, and detachably secured together at the opposite side, substantially as described.

5. A bee-hive composed of a series of main hive frames, a storage frame and door at each side of said main hive frames, the said main hive frames, storage frames and doors being separably hinged at one side of the hive and a detachable securing device at the opposite side of the hive, substantially as described.

6. In a bee-hive the combination with the main hive frames extending above the main body of the hive and shouldered at the top as described, of the doors closing the ends of the frames having the ridges, the covering board and flanged top, substantially as described.

7. A bee hive frame having its top bar composed of two parts, one of said parts being rigidly secured to the standards at one side of the center of said standards, and the other part detached from the standards and adapted to be secured to the other part forming therewith a complete top bar the full width of the standards and holding the comb foundation between them, substantially as described.

In testimony whereof I affix my signature in presence of two witnesses.

DANIEL A. DEWEY.

Witnesses:
L. P. WHITAKER,
JESSIE D. KINGSBERY.